Figure 1:
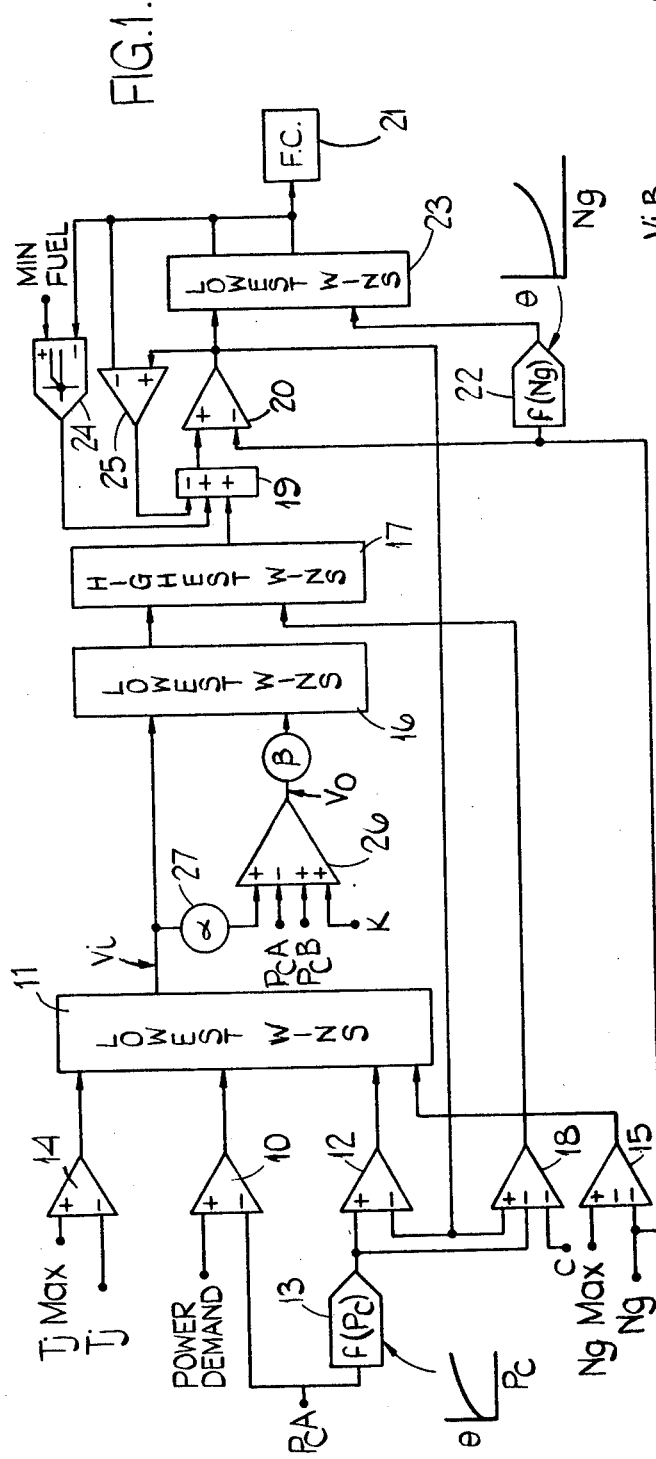

United States Patent [19]

Janes et al.

[11] 4,100,731

[45] Jul. 18, 1978

[54] FUEL CONTROL FOR A MULTI-ENGINE GAS TURBINE INSTALLATION

[75] Inventors: Roderick Stewart Janes, Solihull; Maurice Edward Lloyd, Birmingham, both of England

[73] Assignee: Lucas Industries Limited, Birmingham, England

[21] Appl. No.: 746,347

[22] Filed: Dec. 1, 1976

[51] Int. Cl.² ............................ F02C 9/02; F02C 9/08
[52] U.S. Cl. ................................ 60/39.15; 60/39.28 R
[58] Field of Search ........................ 60/39.15, 39.28 R

[56] References Cited

U.S. PATENT DOCUMENTS

| | | | |
|---|---|---|---|
| 3,174,284 | 3/1965 | McCarthy | 60/39.15 |
| 3,520,133 | 7/1970 | Loft et al. | 60/39.28 R |
| 3,600,888 | 8/1971 | Nethken et al. | 60/39.15 |
| 3,839,860 | 10/1974 | Martin | 60/39.28 R |

Primary Examiner—Louis J. Casaregola

[57] ABSTRACT

An electronic control for a multi-engine gas turbine installation includes two channels each containing a low wins gate with a signal error input and an acceleration limit input, the output of the low wins gate being applied via a high wins gate to an electronic integrator the output of which is compared with a speed signal to provide fuel control for speed governing. For balancing the two channels a difference amplifier provides an output containing information related to the output of one or other low wins gate and the difference between the values of a given parameter of each engine. This acts to control this difference both during steady running and acceleration.

4 Claims, 2 Drawing Figures

FUEL CONTROL FOR A MULTI-ENGINE GAS TURBINE INSTALLATION

This invention relates to a fuel control for a multi-engine gas turbine installation and is of particular (but not exclusive) application to an installation in which a plurality of gas turbines act as gas generators for a single power turbine.

In such a multi-engine installation it is highly desirable to ensure that the two engines are matched, that is to say that the difference between the values of a particular operating parameter of the two engines should be kept to a minimum. It has already been proposed to couple the mechanical fuel systems of a two engine installation to provide matching a lever system which is displaced in accordance with the difference between the operating parameter values being employed for this purpose. Such a system is, however, difficult to set up accurately and can be unreliable in "slam" accelertion conditions.

It is also known to control a single gas turbine engine by means of an electronic fuel control of a type known as a slave datum system. In such a system an error signal corresponding to the difference between the desired value of an engine parameter and the actual value of that parameter is integrated and the output of the integrator is fed to an error amplifier to enable the datum signal derived from the integrator to be compared with a signal corresponding to the same or a different engine parameter, the output of the error amplifier controlling a fuel metering valve. Acceleration is controlled by limiting the error signal to a level determined by engine operating conditions, so that the rate of change of the integrator output is likewise limited.

The application of such a system to a multi-engine installation is somewhat problematic since it is difficult to ensure that the balance between the engines is maintained both in steady state and slam acceleration conditions. It is an object of this invention to provide an electronic fuel control for a multi-engine gas turbine installation in which this difficulty is overcome.

An electronic fuel control in accordance with the invention comprises a plurality of control channels for the respective engines, each control channel including an error signal integrator, first difference signal generating circuit for comparing the output of the integrtor with a signal corresponding to the value of an engine parameter, a fuel supply system controlling the supply of fuel to the associated engine in accordance with the output of the first difference signal generating circuit, error signal generating means for comparing the desired value of an engine parameter with the actual value thereof, limiter means for limiting the output of the error signal generating means during acceleration to a value determined by engine operating conditions, the output of said limiter means being applied as said error signal to the integrator when the engines are running in a normal matched condition, and further limiter means in each channel for further limiting the output of said limiter means when the values of a parameter of the engine controlled by that channel and of the other or another engine of the system differ, said further limited means including a second difference signal generating circuit having inputs corresponding to the error signal from the limiter means of at least one of the control channels and a signal corresponding to the difference between the values of said parameter for the two engines.

In steady state conditions, in which the output of the limited means is usually zero, the difference signal generating circuit will produce a negative signal in the channel in which the value of the parameter to which said further limiter means is sensitive is highest thereby applying a negative input to the integrtor so that its output reduces and fuel to the engine is reduced until the output of the difference signal generating circuit is zero.

During acceleration, if one engine accelerates more quickly than the other, the one which is accelerating most rapidly will have its acceleration rate limited since the difference signal generating circuit of its control channel will produce a positive output less than the limited error signal.

It will be appreciated that the invention is applicable both to fully digital controls, fully analogue controls and also to hybrid controls in which both digital and analogue techniques are employed. Where digital techniques are employed as is known, the various of the elements of each channel may be common and multiplex operated with registers or the like to hold value between the operation for each channel.

Figure 2:
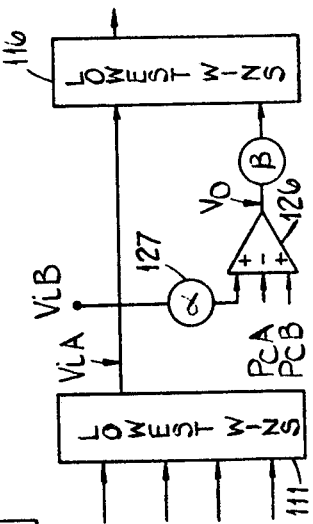

In the accompanying drawings FIG. 1 is a block diagram of one control channel of one example of the invention and FIG. 2 is a diagram of a modification to FIG. 1.

The fuel control described is an analogue system which operates basically by establishing a speed datum signal as a function of the error between the desired value of compressor delivery pressure and the actual value thereof and using this speed datum signal to produce a speed error signal to control the fuel supply. During acceleration and deceleration, to determine the rate of change of the speed datum signal, a function of the compressor delivery pressure, and the actual fuel demand signal is used effectively to apply a limit the pressure error signal.

The pressure error signal is generated by a difference amplifier 10 which has an input from a power demand signal generator (not shown) at its non-inverting input terminal and an input from a pressure transducer at its inverting input terminal.

A conventional lowest wins gate 11 has one input from the difference amplifier 10 and also has an input from a difference amplifier 12 providing an acceleration limit signal. The non-inverting input terminal of the amplifier 12 receives an input from a function generator 13 which generates a signal varying in accordance with the compressor delivery pressure. The function generated by the generator 13 is determined either by consideration of the thermodynamic equations governing the particular engine to be controlled or is set empirically to match the engine and fuel system. The signal to the inverting input terminal of the amplifier 12 is derived from another point in the control to be described hereinafter.

There are two further inputs to the lowest wins gate 11 from difference amplifiers 14 and 15. The amplifier 14 is a temperature limit signal generator which compares a signal from a jet pipe temperature transducer with a preset maximum jet pipe temperature signal and would produce a negative going output if the temperature were to exceed the maximum. The amplifier 15 is an engine speed limit signal generator which would likewise produce a negative going output were the engine speed to exceed a present maximum.

The output of the lowest wins gate 11 is applied via another lowest wins gate 16 to be described in more detail hereinafter to a highest wins gate 17 which has another input from a deceleration limit signal generator in the form of a difference amplifier 18 having an input at its non-inverting input terminal from the generator 13 and an input at its inverting input terminal from the same point as the input to the inverting input terminal to the amplifier 12. A negative offset is also applied to the amplifier 18.

The output of the highest wins gate 17 is applied to a non-inverting input terminal of an integrator 19 the output of which is applied to the non-inverting input teminal of a speed error amplifier 20. The output of the integrator 19 is the speed datum signal referred to above and the output of the amplifier 20 is a speed error signal which is used by a fuel flow control 21 as a fuel demand signal. The speed error signal is generated by applying to the inverting input terminal of the amplifier 20 the signal from the speed transducer (which is also applied to the amplifier 15) and it is the output of the amplifier 20 which is applied to the inverting input terminals of the acceleration and deceleration limit signal amplifiers 12, 18.

For controlling the engine during starting a further function generator 22 is connected to the speed transducer and produces a fuel demand signal for low engine speeds and this is fed, together with the signal from the amplifier 20, to a lowest wins gate 23 the output of which is applied to the fuel flow control 21. During starting the generator 22 wins the gate 23.

In order to prevent the fuel demand signal from the gate 23 falling below a preset minimum except during starting a feedback loop around the integrator 19, amplifier 20 and gate 23 is established via a generator 24 which has a transfer function such that when the output from the gate 23 is above a predetermined level the output from the generator 24 is zero. When the output from gate 23 falls below this predetermined level the output of the generator rises linearly to a maximum level. The output of generator 24 is summed with the output from the gate 17 in the input of the interator 19.

A further difference amplifier 25 has an invert input from the output of the gate 23 and a non-invert input from the amplifier 20. Thus when the gate 23 is won by the signal from the generator 22, the generator 25 produces a positive going output proportional to the difference between the signals from the amplifier 20 and the gate 23. This positive going output is applied to an invert input terminal of the integrator so as in these conditions to cause the signal from the amplifier 20 to rise more slowly than the signal from the generator 22 until it is substantially equal to the output of the generator 22. This ensures smooth takeover from starting to normal control.

In steady state conditions the output of the amplifier 10 is zero and this error controls the system. The output of the amplifier 20 and hence of the gate 23 settles at a positive value such that the speed of the engine and the rate of fuel flow to the engine are constant. Governing is effected since any rise in speed will reduce the output of amplifier 20 and cause a corresponding fall in fuel flow. Any small change in the compressor delivery pressure will cause a corresponding change in the output of the integrator and a responsive change in the output of the amplifier 20 to change the fuel flow and hence the speed to restore the required compressor delivery pressure.

A sudden large increase in the power demand signal will cause the error from aplifier 10 to rise so that the output of the integrator 19 rises and, becuase the engine speed rises less quickly, the output of the difference amplifer 20 rises. This rise in the fuel demand signal causes the output of the amplifier 12 to fall to a level less than the pressure error signal so that the amplifier 12 assumes control until the engine speed error signal becomes small enough to allow the pressure error signal to resume normal governing control. Any sudden large decrease in the power demand signal likewise causes the amplifier 18 to assume control via the highest wins gate 17, preventing the integrator output from falling at such a rate as to give an excessive negative speed error with consequent risk of flame-out.

The lowest wins gate 16 forms part of a further limiter means for keeping the engine controlled by this particular control channel matched with the other or another engine in the multi-engine installation. As well as the input from the gate 11, the gate 16 has an input from a difference amplifier 26. The amplifier 26 has one input from the gate 11, via an attenuator 27, another input from the compressor delivery pressure transducer to the other engine and yet another constant input, these three inputs being summed. A further input comes to the amplifier 26 from the compressor delivery pressure transducer of the engine controlled by this channel. Thus the output of the amplifier 26 is represented by the equation $v_o = K + \alpha v_i - (P_c A - P_c B)$ Where $v_o$ is the output signal, $v_i$ is the output from gate 11, K is the added constant, $\alpha$ is a coefficient introduced by the attenuator 27, $P_c A$ is the signal from the compressor delivery pressure transducer of this channel and $P_c B$ is the signal from the compressor delivery pressure transducer of the other channel.

A gain $\beta$ is applied to the output signal from the amplifier 26 before application to the gate 16 and $\alpha$, $\beta$ and K are chosen to suit the system stability, by preferably:

$$\alpha\beta \leq 1 \text{ and } K = 0$$

In normal steady state the $P_c A$ signal is equal to the power demand signal so that the output of amplifier 10 is zero and wins the gate 11. Given that the power demand signal is common to all control channels the signal $P_c B$ will also be equal to the power demand signal and thus $P_c A = P_c B$. In these conditions the provision of the small positive constant K ensures that the zero output of the gate 11 wins the gate 16 and amplifier 26 does not interfere with this normal condition.

A steady state condition can also arise when an engine is unable to achieve the demanded value of $P_c A$ at less than the maximum speed or jet pipe temperature. If the difference between the two pressure transducer signals $P_c A - P_c B$ reaches the value K, the output of amplifier 2 becomes zero and any further increase in $P_c A - P_c B$ causes amplifier 26 to take over control via gate 16 and to reduce fuel and therefore $P_c A$. The pressure error is now slightly positive so that the output of gate 11 is positive and the final equilibrium condition is that amplifier 26 produces a zero output when $P_c A - P_c B$ is equal to $K + \alpha V_i$.

During acceleration, provided that $P_cA$ and $P_cB$ are equal $V_i$ wins the gate 16. If the pressure difference $P_cA - P_cB$ exceeds $K [1 - (V_i/V_{i\,max})]$ where $V_i$max is the highest value of $V_i$ permitted by the action of limit amplifier 12, the amplifier 26 wins gate 16 and controls the acceleration of the engine; slowing down the acceleration to keep the engines nearly in step. It is to be noted that the expression $K [1 - (V_i/V_{i\,max})]$ represents a dead band which reduces in width as $V_i$ increases so that when $V_i$ is equal to $V_i$ max the width of the dead band is zero and no excess pressure is permitted.

During rapid deceleration, the amplifier 10 will produce a large negative going signal which will win the gate 11, but signal from amplifier 18 will be less negative and will capture the gate 17 irrespective of the effect of the amplifier 26.

It will be appreciated that the electronic control described above provides the function of balancing the engines in a multi-engine installation in a very simple and efficaceous manner. In a two-engine installation consisting of engines A and B, the two limiting means are merely interconnected. In an installation of three or more engines the limiting means are connected in a ring to match all the engines. Steady state, acceleration, deceleration, over-temperature and over-speed limit functions are all very readily accommodated. Furthermore application of the start schedule via the gate 23 and the provision of feedback via the function generator 24 allows the balance system to be overridden during start up, which is another function which can be provided only with great complexity in a mechanical system.

In the modification shown in FIG. 2, the difference amplifier 126 has its one input connected to the output of the lowest wins gate 111 of the other control channel, in this case via an attenuator such that the overall gain $\alpha, \beta$ of the amplifier 126 is greater than or equal to unity for these signals, but greater than unity for the pressure signals. An offset K may be required as before, but where this is zero the system runs without the deadband of the FIG. 1 system. The smaller error signal from the gates 111 exercises control of both channels.

In yet a further modification (not shown) the error signals from both channels are applied to the amplifier 26 or 126 in appropriate proportions.

We claim:

1. An electronic fuel control for a multi engine gas turbine installation comprising a plurality of control channels for the respective engines, each control channel including an error signal integrator, first difference signal generating circuit for comparing the output of the integrator with a signal corresponding to the value of an engine parameter, a fuel supply system controlling the supply of fuel to the associated engine in accordance with the output of the first difference signal generating circuit, error signal generating means for comparing the desired value of an engine parameter with the actual value thereof, limiter means for limiting the output of the error signal generating means during acceleration to a value determined by engine operating conditions, the output of said limiter means being applied as said error signal to the integrator when the engines are running in a normal matched condition, and further limiter means in each channel for further limiting the output of said limiter means when the values of a parameter of the engine controlled by that channel and of the other or another engine of the system differ, said further limiter means including a second difference signal generating circuit having inputs corresponding to the error signal from the limiter means of at least one of the control channels and a signal corresponding to the difference between the value of said parameter for the two engines.

2. A control as claimed in claim 1 in which further limiter means also includes an attenuator via which the error signal from the limiter means of the same channel is applied to said second difference signal generating circuit.

3. A control as claimed in claim 1 in which the error signal from the limiter means of a different channel is applied to the second difference signal generating circuit.

4. A control as claimed in claim 1 in which the error signals from the limiter means of each channel are applied to the second difference signal generating circuit.

* * * * *